US008260102B2

(12) United States Patent
Schunk (10) Patent No.: US 8,260,102 B2
(45) Date of Patent: Sep. 4, 2012

(54) 2-TO-1 OPTICAL COUPLER THAT UTILIZES D-SHAPED PLASTIC OPTICAL FIBERS (POFS), A BI-DIRECTIONAL OPTICAL COMMUNICATIONS LINK THAT EMPLOYS THE 2-TO-1 POF OPTICAL COUPLER, AND A METHOD

(75) Inventor: Nikolaus W. Schunk, Maxhuette-Haidhof (DE)

(73) Assignee: Avago Technologies Fiber IP (Singapore) Pte. Ltd, Singapore (SG)

( * ) Notice: Subject to any disclaimer, the term of this patent is extended or adjusted under 35 U.S.C. 154(b) by 273 days.

(21) Appl. No.: 12/713,234

(22) Filed: Feb. 26, 2010

(65) Prior Publication Data

US 2011/0211832 A1 Sep. 1, 2011

(51) Int. Cl.
*G02B 6/26* (2006.01)
(52) U.S. Cl. .......................................................... 385/45
(58) Field of Classification Search .................... None
See application file for complete search history.

(56) References Cited

U.S. PATENT DOCUMENTS

| 4,668,264 | A | * | 5/1987 | Dyott ............................... 65/403 |
| 4,720,161 | A | * | 1/1988 | Malavieille ..................... 385/43 |
| 4,896,932 | A | * | 1/1990 | Cassidy .......................... 385/50 |
| 5,293,435 | A | * | 3/1994 | Takahashi ....................... 385/85 |
| 5,862,285 | A | * | 1/1999 | Danielian et al. ............. 385/121 |
| 6,157,760 | A | | 12/2000 | Fujita et al. |
| 6,473,555 | B1 | | 10/2002 | Kragl et al. |
| 6,661,949 | B1 | * | 12/2003 | James et al. .................... 385/30 |
| 6,929,405 | B2 | | 8/2005 | Fujita et al. |
| 6,996,316 | B2 | * | 2/2006 | Bailey et al. ................... 385/123 |
| 7,206,493 | B2 | | 4/2007 | Kragl |
| 7,248,801 | B2 | | 7/2007 | Fujita et al. |
| 2003/0219199 | A1 | * | 11/2003 | James et al. .................... 385/30 |
| 2006/0245702 | A1 | * | 11/2006 | Cazzini ......................... 385/115 |
| 2009/0324172 | A1 | | 12/2009 | Haga et al. |

FOREIGN PATENT DOCUMENTS

| CN | 1657995 A | 8/2005 |
| JP | 2125206 A | 5/1990 |
| JP | 2001166178 A | 6/2001 |

OTHER PUBLICATIONS

Masatoshi Yonemura, Akari Kawasaki, Manabu Kagami, et al., 250 Mbit/s Bi-directional Single Plastic Optical Fiber Communication System, Special Issue Visible Optical Fiber Communication, Apr. 25, 2005, pp. 18-23, Toyoda Gosei co., Ltd, Japan.

Abang Annuar Ehsan, Sahbudin Shaari and Mohd Kamil Abd. Rahman, Low Cost 1×2 Acrylic-based Plastic Optical Fiber Coupler with Hollow Taper Waveguide, PIERS Online, 2009, pp. 129-132, vol. 5, No. 2.

\* cited by examiner

*Primary Examiner* — Sung Pak (57) ABSTRACT

D-shaped POFs are used to form a 2-to-1 optical coupler. The D-shaped POFs are produced via an extrusion process that is relatively inexpensive to perform and that can be performed with relatively high manufacturing throughput. The D-shaped POFs are bonded together to form a coupler end face having a generally circular cross-sectional area. The coupler end face is interfaced with an end face of a main POF that is generally circular in cross-sectional shape. The resulting D-shaped 2-to-1 optical POF couplers have relatively low insertion loss and relatively high optical coupling efficiency.

25 Claims, 7 Drawing Sheets

2-TO-1 OPTICAL COUPLER THAT UTILIZES D-SHAPED PLASTIC OPTICAL FIBERS (POFS), A BI-DIRECTIONAL OPTICAL COMMUNICATIONS LINK THAT EMPLOYS THE 2-TO-1 POF OPTICAL COUPLER, AND A METHOD

TECHNICAL FIELD OF THE INVENTION

The invention relates to plastic optical fibers (POFs), and more particularly, to a 2-to-1 POF coupler that utilizes D-shaped POFs.

BACKGROUND OF THE INVENTION

In optical communications networks, optical fibers are used to carry optical data signals between optical communications devices connected on opposite ends of optical fibers. In some optical communications networks, a device known as a 2-to-1 optical coupler is used to optically couple signals between an end of an optical fiber and transmit and receive channels of an optical communications device. The 2-to-1 optical coupler is generally an optical splitter comprising a branch-like structure having first, second and third ends. A first branch of the optical coupler extends between the first and second ends of the optical coupler. A second branch of the coupler extends between the first and third ends of the optical coupler.

2-to-1 optical couplers are used in a variety of applications, including, for example, bi-directional communications over POFs. When used for bi-directional communications, the first end of the optical coupler is connected to a first end of a main POF and the second and third ends of the coupler are connected to transmit and receive sides, respectively, of an optical transceiver. In a transmit mode, optical data signals generated on the transmit side of the optical transceiver are passively routed over the 2-to-1 optical coupler from the second end of the coupler to the first end of the coupler. As the optical data signals arrive at the first end of the optical coupler, they are optically coupled into the first end of the main POF. In a receive mode, optical data signals that pass out of the first end of the main POF pass into the first end of the optical coupler and are then passively routed along the second branch of the coupler from the first end of the coupler to the third end of the optical coupler. As the optical data signals pass out of the third end of the coupler, they are received in the receive side of the optical transceiver.

Figures 1A, 1B, 1C:
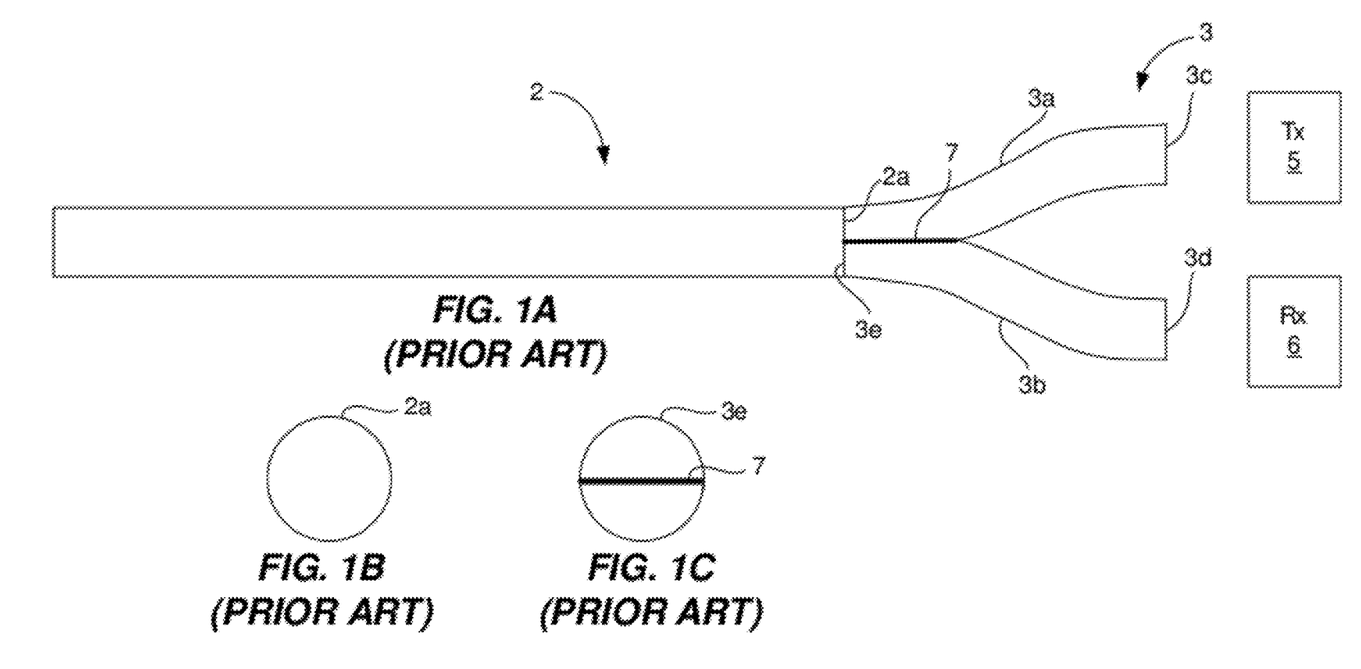
FIG. 1A illustrates a side view of a portion of a typical POF bi-directional optical communications link, which includes a 1.0 mm POF and a 2-to-1 optical coupler.
FIGS. 1B and 1C illustrate front plan views of the end faces of the main POF and of the coupler shown in FIG. 1 that interface with each other.

FIG. 1A illustrates a side view of a portion of a typical POF bi-directional optical communications link, which includes a 1.0 millimeter (mm) POF 2 and a 2-to-1 optical coupler 3. The POF 2 functions as the main optical fiber of the link. In one direction, the 2-to-1 optical coupler 3 routes optical signals generated by a transmitter (Tx) onto an end face 2a of the main POF. In the other direction, the 2-to-1 optical coupler 3 routes optical signals passing out of the end face 2a of the main POF 2 onto a photosensor (not shown) of receiver (Rx) 6. The Tx 5 and the Rx 6 are typically parts of an optical transceiver module (not shown). The main POF 2 is referred to above as a 1.0 mm POF due to the fact that the diameter of the core of the POF 2 is 1.0 mm. The 2-to-1 optical coupler 3 has the branch-like splitter configuration described above, with each branch comprising a respective branch POF 3a and 3b. The branch POFs 3a and 3b are typically also 1.0 mm POFs. The end face 2a of the main POF 2 has a cross-sectional area equal to $8/32\pi$, where $\pi=3.14159$. Likewise, the end faces 3c and 3d of the branch POFs 3a and 3b, respectively, have cross-sectional areas equal to $8/32\pi$. However, the end faces of the branch POFs 3a and 3b that interface with the end face 2a of the main POF 2 are each reduced in cross-sectional area by approximately 50% to form a coupler end face 3e having a cross-sectional area of $8/32\pi$, which matches the cross-sectional area of the end face 2a of the main POF 2.

FIGS. 1B and 1C illustrate front plan views of the end faces 2a and 3e of the main POF 2 and of the coupler 3, respectively. It can be seen from FIGS. 1B and 1C that the end faces 2a and 3e have equal cross-sectional areas. A variety of techniques may be used to reduce the cross-sectional areas of the end faces of the branch POFs 3a and 3b to form the coupler end face 3e. Polishing and chisel cutting are two well know techniques that are used for this purpose. In addition, in some cases a technique known as metal evaporation is used to form a metal layer 7 between the branch POFs 3a and 3b at the coupler end face 3e to prevent light from being coupled between the branch POFs, i.e., to prevent optical cross-talk. A configuration of the type shown in FIGS. 1A-1C is disclosed in U.S. Pat. No. 7,206,493. Another technique for varying the cross-sectional areas of the end faces of the branch POFs is a hot molding technique that uses a molding tool in combination with heat to provide the coupler end face with a desired non-circular cross-sectional shape. Such a technique is disclosed in U.S. Pat. No. 6,473,555.

The use of the aforementioned techniques of chisel cutting, polishing and hot molding to form the non-circular cross-sectional end faces increases manufacturing costs and limits production throughput. A need exists for a 2-to-1 POF optical coupler in which the non-circular cross-sectional end faces can be produced at relatively low manufacturing costs and with relatively high manufacturing throughput.

SUMMARY OF THE INVENTION

The invention is directed to a POF 2-to-1 optical coupler comprising D-shaped POFs, a bi-directional optical communications link in which the 2-to-1 optical coupler is used, and a method for performing bi-directional optical communications. The optical coupler comprises first and second D-shaped POFs. Each of the first and second D-shaped POFs has first and second end faces. The second end faces of the first and second D-shaped POFs are bonded together to form a coupler end face having a generally circularly-shaped cross-section. The coupler end face is configured to interface with a first end face of a generally circularly-shaped main POF. The coupler end face has a cross-sectional area that is approximately equal to a cross-sectional area of the first end face of the generally circularly-shaped main POF.

The bi-directional optical communications link comprises a main POF and the 2-to-1 optical coupler. The main POF has first and second end faces. The first end face of the main POF is interfaced with the coupler end face.

The method for providing bi-directional communications comprises providing the 2-to-1 optical coupler, providing the main POF, interfacing the coupler end face with the first end face of the main POF, and transmitting and receiving optical signals over the main POF and the 2-to-1 optical coupler.

These and other features and advantages of the invention will become apparent from the following description, drawings and claims.

DETAILED DESCRIPTION OF AN ILLUSTRATIVE EMBODIMENT

In accordance with the invention, D-shaped POFs are used to form a 2-to-1 optical coupler. The D-shaped POFs are produced by using a D-shaped extrusion die. The D-shaped POFs are bonded together to form a coupler end face having a generally circular cross-sectional area. The coupler end face is interfaced with an end face of a main POF that is generally circular in cross-sectional shape. The term "D-shaped", as that term is used herein, is intended to denote a shape of a semicircle. The resulting D-shaped 2-to-1 optical POF couplers have relatively low insertion loss and relatively high optical coupling efficiency. In addition, because the POFs are produced via the extrusion process, the 2-to-1 POF optical couplers can be manufactured at relatively low cost and with relatively high manufacturing throughput.

Figure 2A:
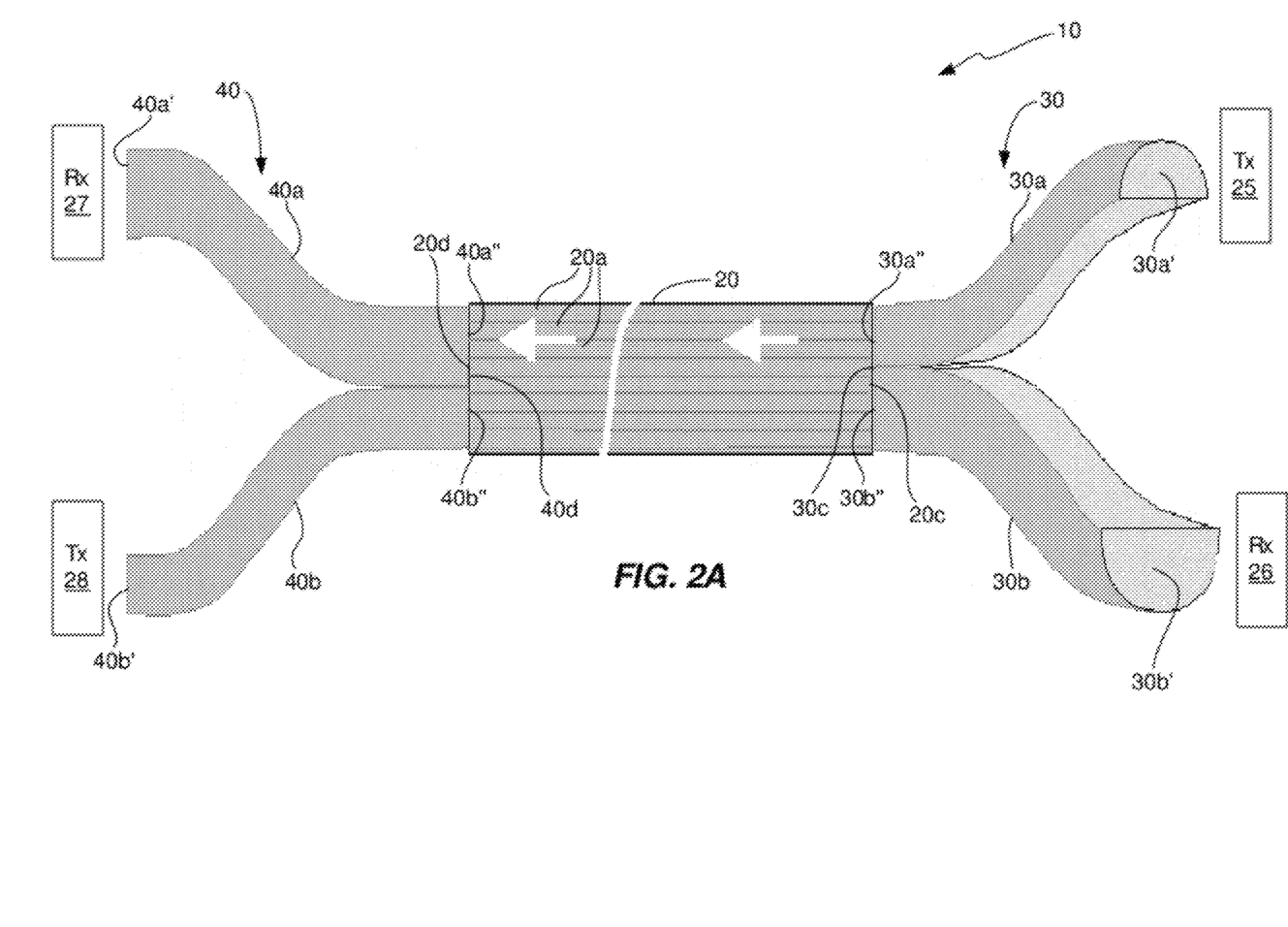
FIG. 2A illustrates a plan view of an optical communications link that incorporates 2-to-1 optical POF couplers that utilize D-shaped POFs in accordance with an illustrative embodiment.

FIG. 2A illustrates a plan view of an optical communications link 10 in accordance with an illustrative embodiment. The link 10 includes a main multi-core POF 20, a first 2-to-1 POF optical coupler 30 and a second 2-to-1 POF optical coupler 40. The main multi-core POF 20 comprises a plurality of smaller POFs 20a that are bundled together to form the main multi-core POF 20. The main multi-core POF 20 has a first end face 20c and a second end face 20d. The end faces 20c and 20d are generally circular in cross-sectional shape. The first 2-to-1 POF optical coupler 30 comprises first and second D-shaped POFs 30a and 30b. The first D-shaped POF 30a has a first D-shaped end face 30a' and a second D-shaped end face 30a". The second D-shaped POF 30b has a first D-shaped end face 30b' and a second D-shaped end face 30b". The D-shaped end faces 30a' and 30b' typically, but not necessarily, interface with a Tx 25 and an Rx 26, respectively. The Tx 25 and the Rx 26 are typically part of an optical transceiver module (not shown). The D-shaped end faces 30a" and 30b" opposite end faces 30a' and 30b', respectively, are combined via a bonding process, such as, for example, hot embossing, adhesion or by mechanically clamping them together, to form a coupler end face 30c that has a generally circular cross-sectional shape. Therefore, the cross-sectional shape of the end face 30c of the coupler 30 is generally the same as the cross-sectional shape of the end face 20c of the main multi-core POF 20.

The second 2-to-1 POF optical coupler 40 comprises first and second D-shaped POFs 40a and 40b. The first D-shaped POF 40a has a first D-shaped end face 40a' and a second D-shaped end face 40a". The second D-shaped POF 40b has a first D-shaped end face 40b' and a second D-shaped end face 40b". The D-shaped end faces 40a' and 40b' typically, but not necessarily, interface with an Rx 27 and a Tx 28, respectively. The Rx 27 and the Tx 28 are typically part of an optical transceiver module (not shown). The D-shaped end faces 40a" and 40b" opposite end faces 40a' and 40b', respectively, are combined via a bonding process, such as, for example, hot embossing, adhesion, or by mechanically clamping them together, to form a coupler end face 40d that has a generally circular cross-sectional shape. Therefore, the cross-sectional shape of the end face 40d of the coupler 40 is generally the same as the cross-sectional shape of the end face 20d of the main multi-core POF 20.

The D-shaped end face 30a' of POF 30a is the shape of one halve of a circle (i.e., a semicircle) having a diameter of about ⅓ of a millimeter (mm), or about 0.33 mm. The D-shaped end face 30b' of POF 30b is the shape of one halve of a circle having a diameter of about ⅔ mm, or 0.66 mm. The end face 20c of the main multi-core POF 20 has a diameter of about 1.0 mm. The D-shaped end face 40a' of POF 40a is the shape of one halve of a circle having a diameter of about 0.66 mm. The D-shaped end face 40b' of POF 40b is the shape of one halve of a circle having a diameter of about 0.33 mm. The end face 20d of the main multi-core POF 20 has a diameter of about 1.0 mm.

Figure 2B:
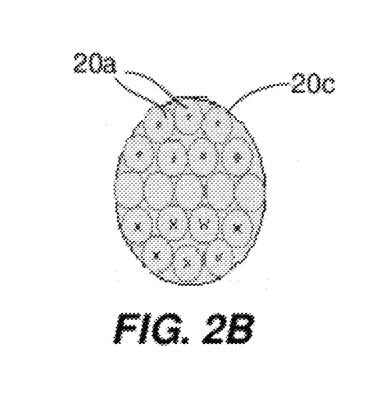
FIGS. 2B and 2C illustrate cross-sectional views of opposite end faces of the main multi-core POF shown in FIG. 2A.
Figure 2C:
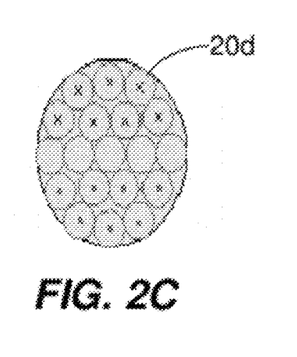
Figure 2D:
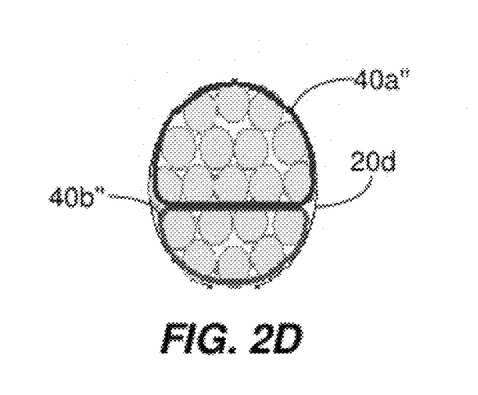
FIG. 2D illustrates a cross-sectional view of the interface between the end face of the main multi-core POF shown in FIG. 2A and the end faces of the coupler POFs shown in FIG. 2A.
Figure 2E:
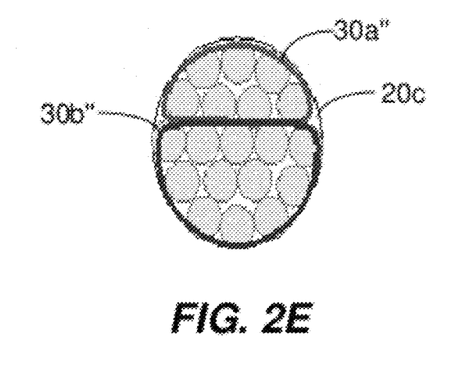
FIG. 2E illustrates a cross-sectional view of the interface between the end face of the main multi-core POF shown in FIG. 2A and the end faces of the coupler POFs shown in FIG. 2A.

FIGS. 2B and 2C illustrate cross-sectional views of the end faces 20c and 20d, respectively, of the main multi-core POF 20. FIG. 2D illustrates a cross-sectional view of the interface between the end face 20d of the main multi-core POF 20 and the end faces 40a" and 40b" of the coupler POFs 40a and 40b, respectively. FIG. 2E illustrates a cross-sectional view of the interface between the end face 20c of the main multi-core POF 20 and the end faces 30a" and 30b" of the coupler POFs 30a and 30b, respectively. In FIG. 2B, the individual cores 20a of the multi-core POF 20 have either arrow heads or arrow tails in their centers. The arrow heads indicate that light is propagating through the cores 20a in a direction out of the drawing page. The arrow tails indicate that light is propagating through the cores 20a in a direction into the drawing page.

In the illustrative embodiment, the multi-core POF 20 contains nineteen individual cores 20a. The arrow heads and arrow tails shown in FIGS. 2B and 2C, respectively, indicate that seven cores 20a located in the upper portion of the multi-core POF 20 are used for transmitting light in the direction from Tx 25 to Rx 27. The arrow tails and arrow heads shown in FIGS. 2B and 2C, respectively, indicate that seven cores 20a located in the lower portion of the multi-core POF 20 are used for transmitting light in the direction from Tx 28 to Rx 26.

With the dimensions described above, light launched into the 0.33 mm-diameter D-shaped end face 30a' at the Tx 25 side of the link 10 is optically coupled into seven of the cores 20a of the main multi-core POF 20. At the Rx 27 side, light propagating in seven of the cores 20a of the multi-core POF 20 is coupled into the 0.66 mm-diameter end face 40a", which is large enough to overlap twelve of the cores 20a. This overlap on the Rx 27 side ensures that there is low insertion loss and high optical coupling efficiency in the direction from the Tx 25 to the Rx 27. Similarly, light launched into the 0.33 mm-diameter D-shaped end face 40b' at the Tx 28 side of the link 10 is optically coupled into seven of the cores 20a of the main multi-core POF 20. At the Rx 26 side, light propagating in seven of the cores 20a of the multi-core POF 20 is coupled into the 0.66 mm-diameter end face 30b", which is large enough to overlap twelve of the cores 20a. This overlap on the Rx 26 side ensures that there is low insertion loss and high optical coupling efficiency in the direction from the Tx 28 to the Rx 26.

Figure 3:
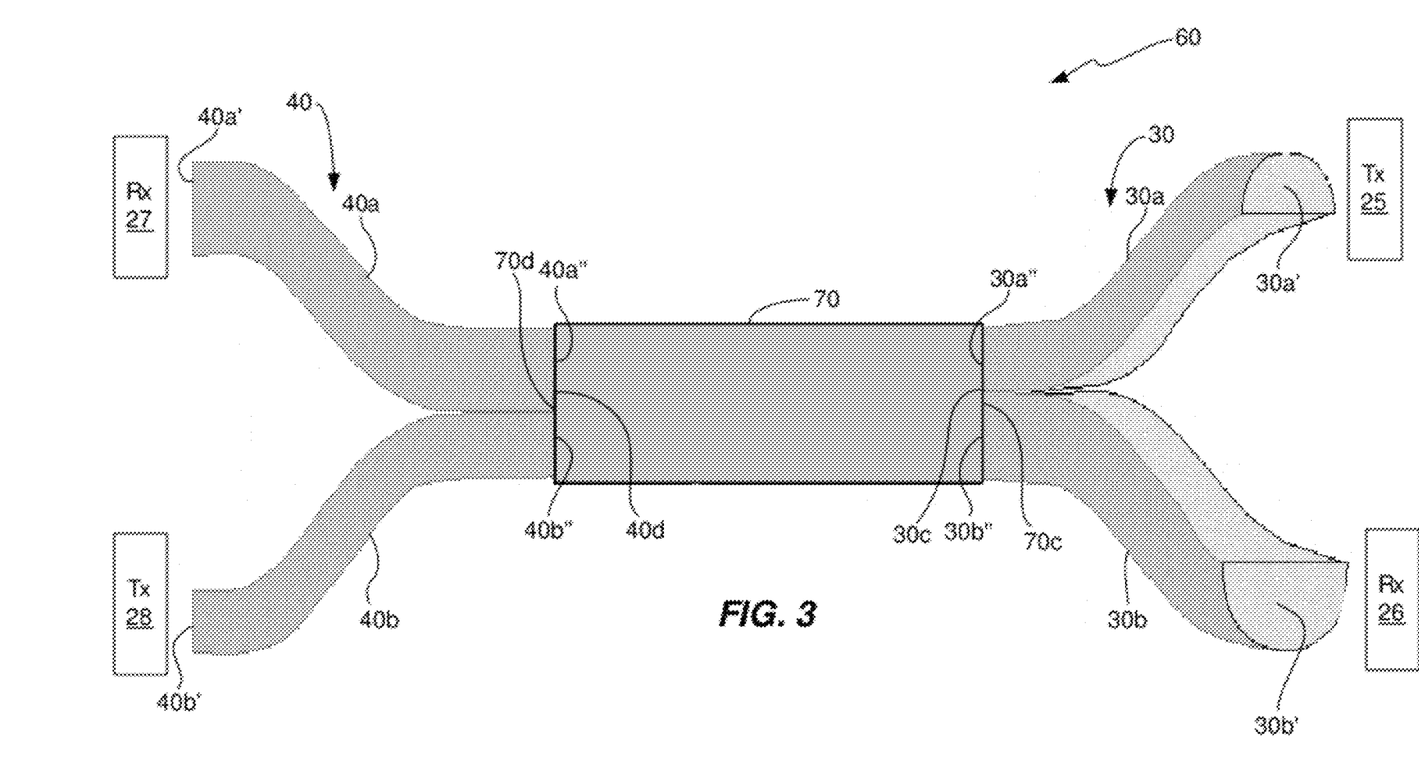
FIG. 3 illustrates a plan view of an optical communications link that incorporates 2-to-1 optical POF couplers that utilize D-shaped POFs in accordance with another illustrative embodiment.

FIG. 3 illustrates a plan view of an optical communications link 60 in accordance with another illustrative embodiment. The link 60 is identical to the link 10 shown in FIG. 3A except that the link 60 uses a single-core POF 70 instead of the multi-core POF 20 shown in FIG. 3A. Thus, the link 60 includes a main single-core POF 70, a first 2-to-1 POF optical coupler 30 and a second 2-to-1 POF optical coupler 40. The main POF 70 has a first end face 70c and a second end face 70d. The end faces 70c and 70d are generally circular in cross-sectional shape. The first and second 2-to-1 POF optical couplers 30 and 40 shown in FIG. 3 are identical to the first and second 2-to-1 POF optical couplers 30 and 40 shown in FIG. 2A. The single-core POF 70 is typically about 1.0 mm in diameter. Like the link 10 shown in FIG. 2, the link 60 shown in FIG. 3 provides high coupling efficiency in the direction from the Tx 25 to the Rx 27 and in the direction from the Tx 28 to the Rx 26. In addition, the 1.0 mm POF 70 will typically be less expensive than the multi-core POF 20 and may be more desirable in cases in which shorted link lengths are needed. In addition, this embodiment may be particularly useful in the case where vertical cavity surface emitting laser diodes (VCSELs) are used in the Txs 25 and 28 due to the narrow far field radiation that VCSELs provide.

The invention is not limited to any particular dimensions for the D-shaped coupler POFs 30 and 40 or for the link POFs 20 and 70. For example, the D-shaped coupler POFs 30 and 40 shown in FIG. 3 may be 0.5 mm-diameter POFs. In this embodiment, light emitting diodes (LEDs) may be used in the Txs 25 and 28, although laser diodes may also be used in the Txs 25 and 28.

Figure 4:
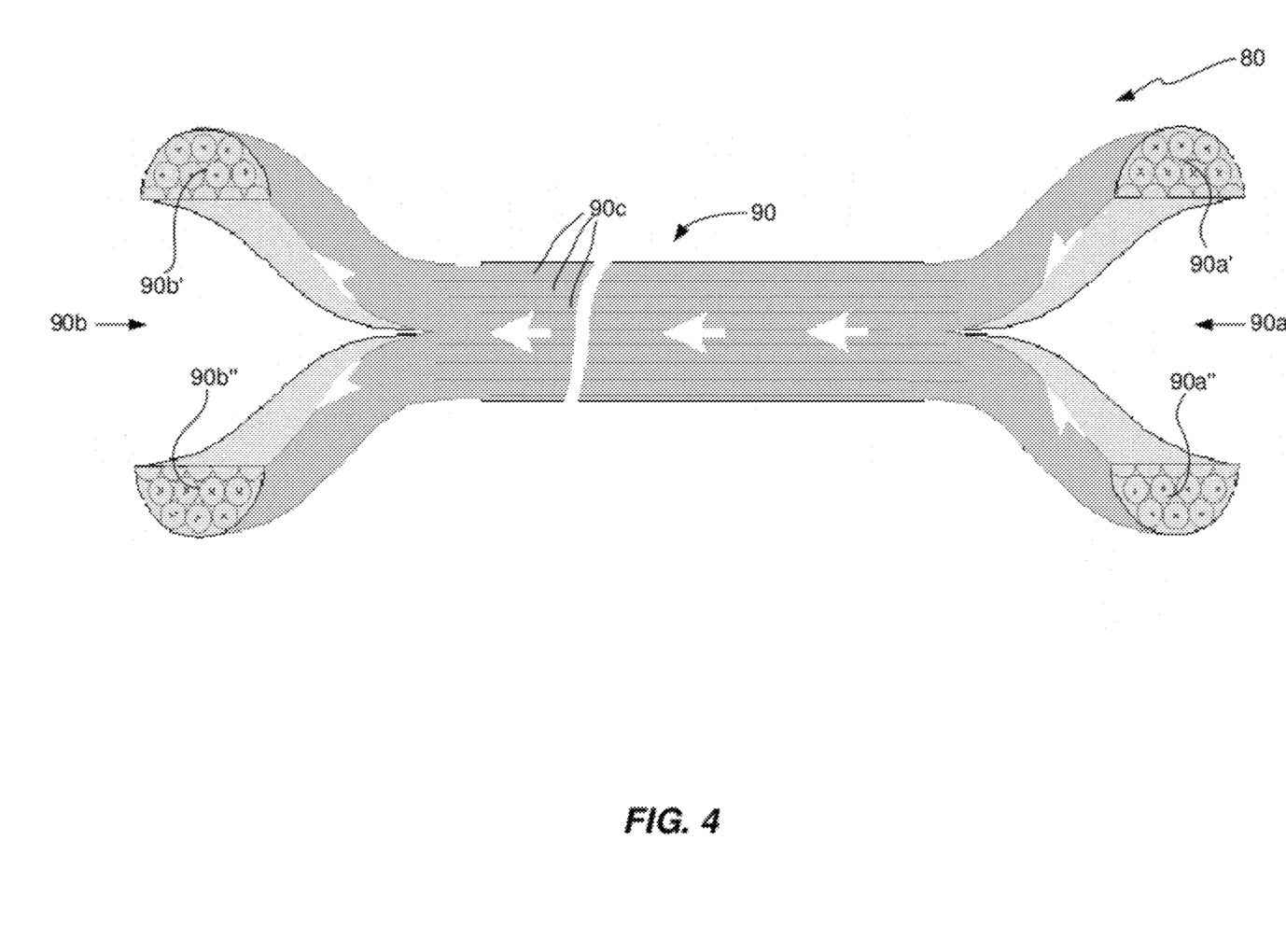
FIG. 4 illustrates a plan view of an optical communications link that incorporates 2-to-1 optical POF couplers that utilize D-shaped POFs in accordance with another illustrative embodiment.

FIG. 4 illustrates a plan view of an optical communications link 80 in accordance with another illustrative embodiment. The link 80 comprises a multi-core POF 90 having first and second split ends 90a and 90b, respectively. The end 90a has been split to form first and second D-shaped (i.e., semicircular) ends 90a' and 90a", respectively. The end 90b has been split to form first and second D-shaped (i.e., semicircular) ends 90b' and 90b", respectively. In accordance with this embodiment, the multi-core POF 90 has a diameter of about 1.0 mm and has nineteen cores 90c. Thus, each of the D-shaped ends 90a' and 90a", 90b', and 90b" is one halve of a circle having a diameter of about 1.0 mm. The link 80 of this embodiment is particularly well suited for being implemented as an active optical fiber cable. The multi-core configuration of the link 80 prevents or reduces splitting losses, thereby enabling the length of the link 80 to be increased.

Figure 5:
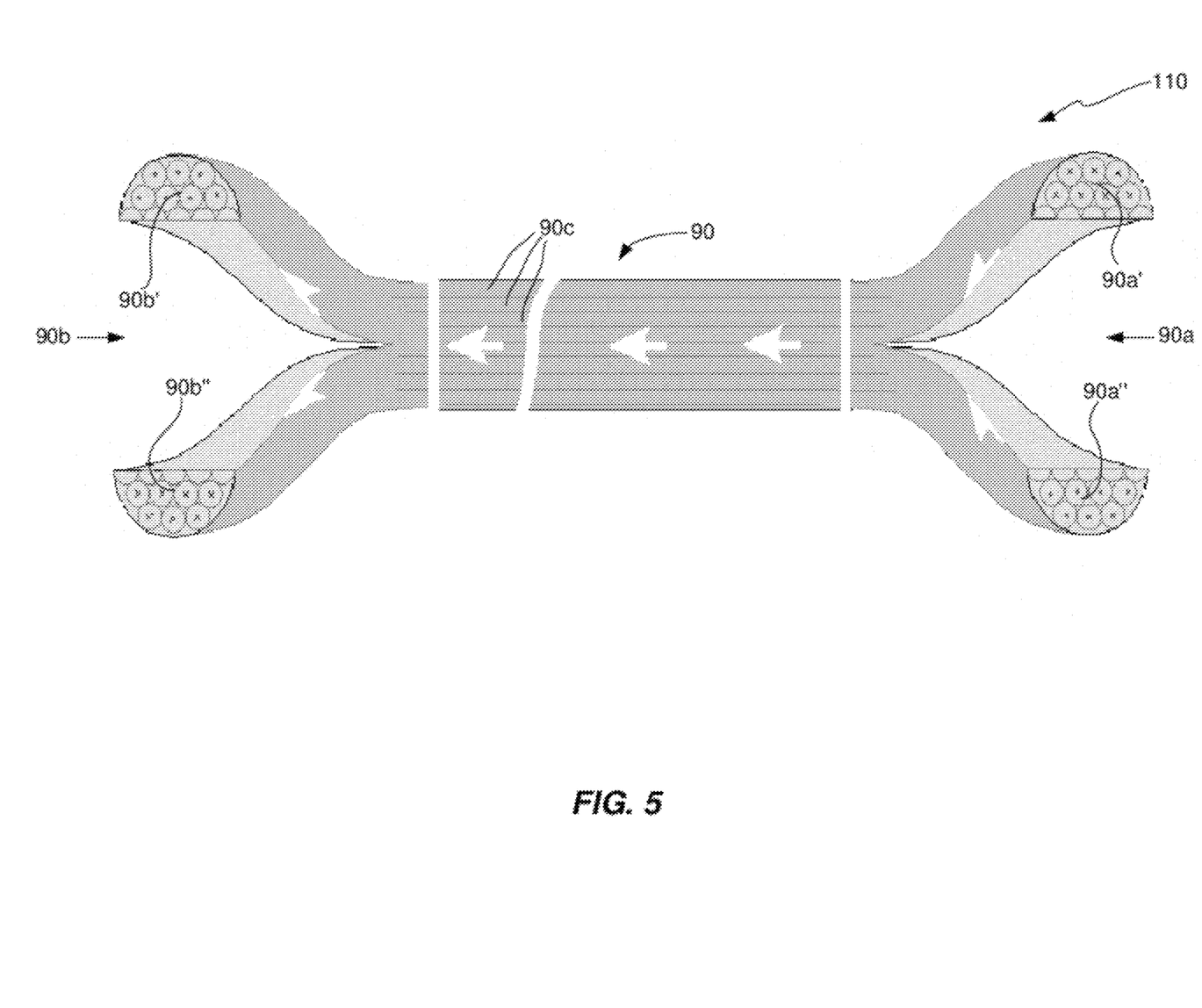
FIG. 5 illustrates a plan view of an optical communications link that incorporates 2-to-1 optical POF couplers that utilize D-shaped POFs in accordance with another illustrative embodiment.

FIG. 5 illustrates a plan view of an optical communications link 110 in accordance with another illustrative embodiment. The link 110 is identical to the link 80 shown in FIG. 4 except that the ends 90a and 90b of the link 110 are multi-core POF stubs that are essentially short lengths of the main multi-core POF 90 that have been split to form the D-shaped ends 90a', 90a", 90b', and 90b". Like the link 80 shown in FIG. 4, the multi-core configuration of the link 110 prevents or reduces splitting losses, thereby enabling the length of the link 100 to be varied by connecting the main multi-core POF 90 according to the required length for the application.

Figure 6:
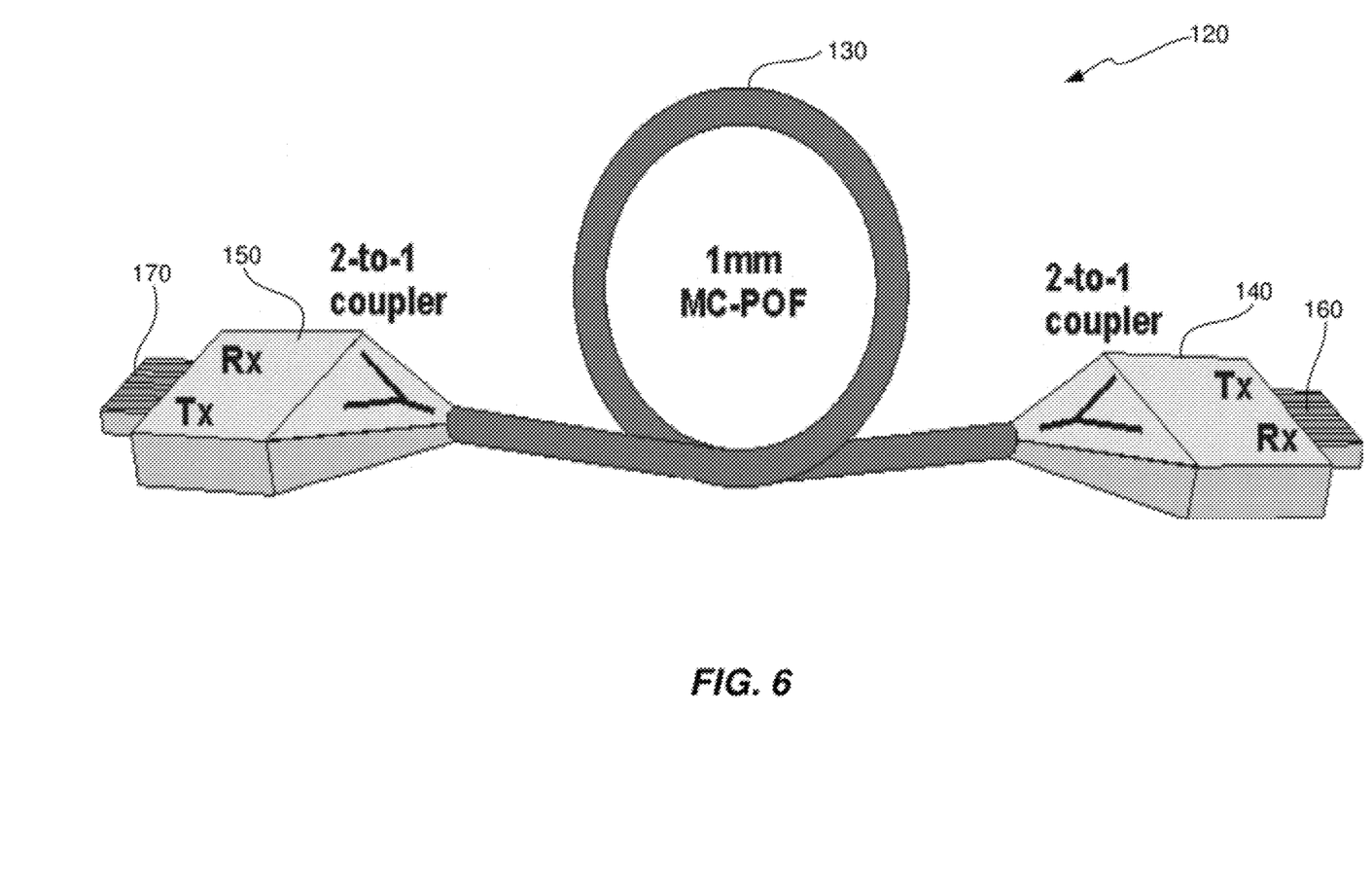
FIG. 6 illustrates an active optical fiber cable that incorporates one of the 2-to-1 POF coupler shown in FIGS. 2A and 3-5.

FIG. 6 illustrates an active optical fiber cable 120 that incorporates the 2-to-1 POF coupler of the invention. The cable 120 has a 1.0 mm POF 130 and first and connectors 140 and 150 attached to opposite ends of the cable 130. Each of the connectors 140 and 150 contains one of the 2-to-1 optical POF couplers shown in FIGS. 2A and 3-5. In addition, each of the connectors 140 and 150 includes optical-to-electrical conversion devices (e.g., photodiodes) and electrical-to-optical conversion devices (e.g., laser diodes or LEDs). The connectors 140 and 150 also include electrical contacts 160 and 170, respectively, for electrically interfacing the connectors 140 and 150 with electrical circuitry (not shown) external to the connectors 140 and 150.

As described above, the D-shaped POF optical couplers of the invention are created through an extrusion process during which plastic used to make the POFs is forced through D-shaped extrusion dies (not shown). The extrusion die has a shape that is complementary to the D-shaped cross-section of the POF to be produced. Semisoft plastic is forced through the D-shaped extrusion die to form each D-shaped POF. The extrusion dies all have the same D shape, although the dimensions of the dies will vary in accordance with the dimensions of the D-shaped POF that is being produced. The extrusion process enables the couplers to be manufactured at relatively low cost and with relatively high manufacturing throughput. The resulting D-shaped 2-to-1 optical POF couplers have relatively low insertion loss and relatively high optical coupling efficiency. These features make the couplers highly desirable for many applications, although the invention is not limited to any particular applications.

The invention has been described with reference to illustrative, or exemplary, embodiments. It will be understood by persons of ordinary skill in the art, in view of the description provided herein, that many modifications may be made to the embodiments described herein that are within the scope of the invention. For example, while the embodiments described herein refer to particular dimensions for the main POF and D-shaped POFs of the couplers, the invention is not limited to these dimensions. Those of ordinary skill in the art will understand the manner in which these dimensions and other features may be modified without deviating from the scope of the invention.

What is claimed is:

1. A plastic optical fiber (POF) 2-to-1 optical coupler for use in a bi-directional optical communications link, the optical coupler comprising:
   a first D-shaped POF having a first D-shaped end face and a second D-shaped end face;
   a second D-shaped POF having a first D-shaped end face and a second D-shaped end face; and
   a coupler end face configured to interface with a first end face of a generally circularly-shaped POF, the coupler end face comprising the second D-shaped end faces of the first and second D-shaped POFs, wherein the second end faces of the first and second D-shaped POFs are bonded together to form the coupler such that the coupler end face has a generally circularly-shaped cross section, and wherein the coupler end face has a cross-sectional area that is approximately equal to a cross-sectional area of the first end face of the generally circularly-shaped POF.

2. The POF 2-to-1 optical coupler of claim 1, wherein the first and second D-shaped end faces of the first and second D-shaped POFs, respectively, each have shapes of one halve of a circle having a diameter of approximately 0.33 millimeters (mm).

3. The POF 2-to-1 optical coupler of claim 2, wherein the second and first D-shaped end faces of the first and second D-shaped POFs, respectively, each have shapes of one halve of a circle having a diameter of approximately 0.66 millimeters (mm).

4. The POF 2-to-1 optical coupler of claim 1, wherein the first and second D-shaped end faces of the first and second D-shaped POFs, respectively, each have shapes of one halve of a circle having a diameter of approximately 0.5 millimeters (mm).

5. The POF 2-to-1 optical coupler of claim 4, wherein the second and first D-shaped end faces of the first and second D-shaped POFs, respectively, each have shapes of one halve of a circle having a diameter of approximately 0.5 millimeters (mm).

6. The POF 2-to-1 optical coupler of claim 1, wherein the first and second D-shaped end faces of the first and second D-shaped POFs, respectively, each have shapes of one halve of a circle having a diameter of approximately 0.33 millimeters (mm).

7. The POF 2-to-1 optical coupler of claim 1, wherein the first and second D-shaped POFs each are multi-core POFs.

8. The POF 2-to-1 optical coupler of claim 7, wherein the first and second D-shaped end faces of the first and second D-shaped POFs, respectively, each have shapes of one halve of a circle having a diameter of approximately 0.33 millimeters (mm).

9. The POF 2-to-1 optical coupler of claim 8, wherein the second and first D-shaped end faces of the first and second D-shaped POFs, respectively, each have shapes of one halve of a circle having a diameter of approximately 0.66 millimeters (mm).

10. The POF 2-to-1 optical coupler of claim 7, wherein the first and second D-shaped end faces of the first and second D-shaped POFs, respectively, each have shapes of one halve of a circle having a diameter of approximately 0.5 millimeters (mm).

11. The POF 2-to-1 optical coupler of claim 10, wherein the second and first D-shaped end faces of the first and second D-shaped POFs, respectively, each have shapes of one halve of a circle having a diameter of approximately 0.5 millimeters (mm).

12. An optical communications link comprising:
a main plastic optical fiber (POF), the main POF having a generally circularly-shaped cross-section, the main POF having first and second end faces; and
a POF 2-to-1 optical coupler comprising:
a first D-shaped POF having a first D-shaped end face and a second D-shaped end face;
a second D-shaped POF having a first D-shaped end face and a second D-shaped end face; and
a coupler end face interfaced with the first end face of the main POF, the coupler end face comprising the second D-shaped end faces of the first and second D-shaped POFs, wherein the second end faces of the first and second D-shaped POFs are bonded together to form the coupler such that the coupler end face has a generally circularly-shaped cross section, and wherein the coupler end face has a cross-sectional area that is approximately equal to a cross-sectional area of the first end face of the main POF.

13. The optical communications link of claim 12, wherein the first and second D-shaped end faces of the first and second D-shaped POFs, respectively, each have shapes of one halve of a circle having a diameter of approximately 0.33 millimeters (mm).

14. The optical communications link of claim 13, wherein the second and first D-shaped end faces of the first and second D-shaped POFs, respectively, each have shapes of one halve of a circle having a diameter of approximately 0.66 millimeters (mm).

15. The optical communications link of claim 12, wherein the first and second D-shaped end faces of the first and second D-shaped POFs, respectively, each have shapes of one halve of a circle having a diameter of approximately 0.5 millimeters (mm).

16. The optical communications link of claim 15, wherein the second and first D-shaped end faces of the first and second D-shaped POFs, respectively, each have shapes of one halve of a circle having a diameter of approximately 0.5 millimeters (mm).

17. The optical communications link of claim 12, wherein the first and second D-shaped end faces of the first and second D-shaped POFs, respectively, each have shapes of one halve of a circle having a diameter of approximately 0.33 millimeters (mm).

18. The optical communications link of claim 12, wherein the first and second D-shaped POFs each are multi-core POFs.

19. The optical communications link of claim 18, wherein the first and second D-shaped end faces of the first and second D-shaped POFs, respectively, each have shapes of one halve of a circle having a diameter of approximately 0.33 millimeters (mm).

20. The optical communications link of claim 19, wherein the second and first D-shaped end faces of the first and second D-shaped POFs, respectively, each have shapes of one halve of a circle having a diameter of approximately 0.66 millimeters (mm).

21. The optical communications link of claim 18, wherein the first and second D-shaped end faces of the first and second D-shaped POFs, respectively, each have shapes of one halve of a circle having a diameter of approximately 0.5 millimeters (mm).

22. The optical communications link of claim 21, wherein the second and first D-shaped end faces of the first and second D-shaped POFs, respectively, each have shapes of one halve of a circle having a diameter of approximately 0.5 millimeters (mm).

23. The optical communications link of claim 12, wherein the main POF is a single-core POF.

24. The optical communications link of claim 12, wherein the main POF is a multi-core-core POF.

25. A method for bi-directionally communicating optical signals over an optical communications link, the method comprising:
providing a main plastic optical fiber (POF), the main POF having a generally circularly-shaped cross-section, the main POF having first and second end faces; and
providing a POF 2-to-1 optical coupler comprising:
a first D-shaped POF having a first D-shaped end face and a second D-shaped end face;
a second D-shaped POF having a first D-shaped end face and a second D-shaped end face; and
a coupler end face configured to interface with the first end face of the main POF, the coupler end face comprising the second D-shaped end faces of the first and second D-shaped POFs, wherein the second end faces of the first and second D-shaped POFs are bonded together to form the coupler such that the coupler end face has a generally circularly-shaped cross section;
interfacing the coupler end face with the first end face of the main POF, wherein the coupler end face has a cross-sectional area that is approximately equal to a cross-sectional area of the first end face of the main POF; and
transmitting and receiving optical signals over the main POF and the POF 2-to-1 optical coupler.

* * * * *